United States Patent

Reynard

[15] 3,687,169
[45] Aug. 29, 1972

[54] FLEXIBLE PIPE FOR CONVEYING FLUIDS, PARTICULARLY HYDROCARBONS

[72] Inventor: Remi Reynard, Montesson, France

[73] Assignee: Institut Francais Du Petrole, Des Carburants Et Lubrifiants, Rueil-Malmaison, France

[22] Filed: July 16, 1970

[21] Appl. No.: 55,347

Related U.S. Application Data

[63] Continuation-in-part of Ser. No. 678,357, Oct. 26, 1967, abandoned.

[30] Foreign Application Priority Data

Oct. 27, 1966    France......................6681871

[52] U.S. Cl..................................138/134, 138/135
[51] Int. Cl.............................................F16z 11/04
[58] Field of Search............................138/130–139; 285/149

[56] References Cited

UNITED STATES PATENTS

| | | |
|---|---|---|
| 755,204 | 3/1904 | Witzenmann..............138/135 |
| 1,133,070 | 3/1915 | Subers......................138/135 |
| 2,706,494 | 4/1955 | Morse.................138/130 UX |
| 3,086,556 | 4/1963 | Kanter......................138/131 |

*Primary Examiner*—Edward J. Earls
*Attorney*—Craig, Antonelli & Hill

[57] ABSTRACT

A flexible pipe for conveying diphasic fluids under pressure which includes a flexible tubular core of an elastomeric or plastic material, an inner reinforcing means which resists compression and is in contact with the internal wall of the tubular core and an external clamping means enclosing the tubular core. The internal reinforcing means and external clamping means subject the core to a compression not less than 50 kg/cm² and at least equal to the maximum internal pressure of the fluid conveyed in the pipe. The internal reinforcement means is preferably a helical winding of a metallic band or strip which is adapted to withstand compression. The external clamping means is, preferably, a metallic wire, strand, band or cable helically wound around the core.

12 Claims, 8 Drawing Figures

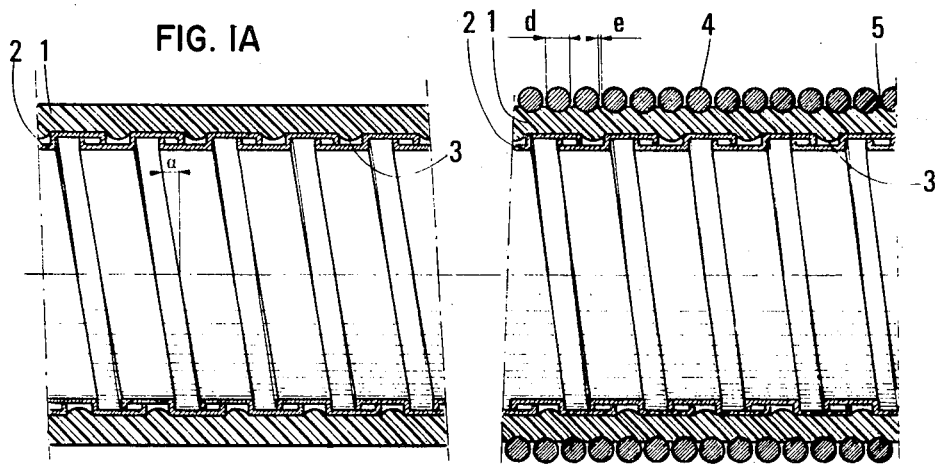
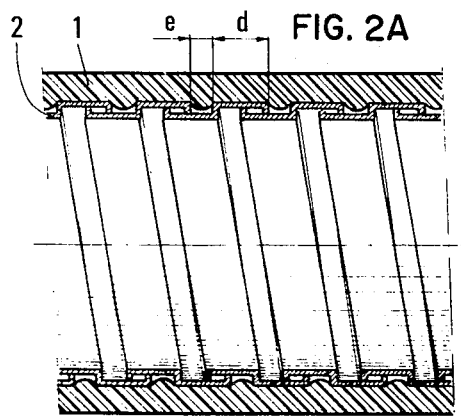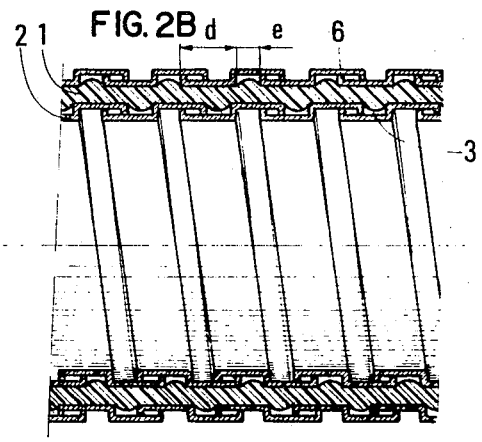
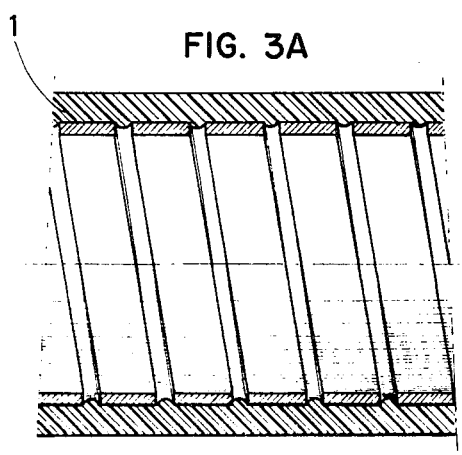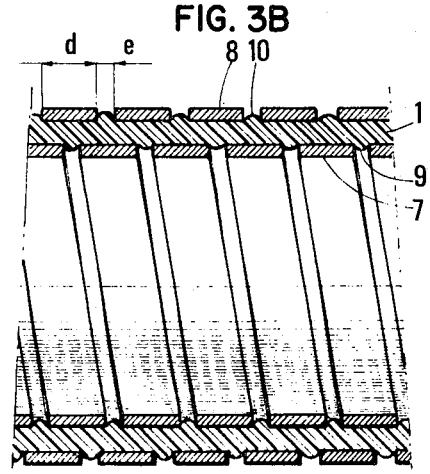

FLEXIBLE PIPE FOR CONVEYING FLUIDS, PARTICULARLY HYDROCARBONS

The present application is a continuation-in-part application, Ser. No. 678,357, now abandoned, filed Oct. 26, 1967.

BACKGROUND OF THE INVENTION

The present invention relates to a flexible pipe for conveying fluids, particularly hydrocarbons. The flexible pipe is provided with a tubular core made of an elastomeric or thermoplastic material, the internal wall of which is in contact with the fluid or the mixture of fluids to be conveyed.

It has been found, in actual practice, that pipes of the type which comprise a core made of an elastomeric material which may contain a reinforcing means resistant to pressure consisting of, for example, layers of reinforcing metallic wire or metallic strands, that are helically wound around the elastomeric tube or embedded within the elastomer itself, deteriorate rapidly when they are used for conveying diphasic fluids. Diphasic fluids consist of a mixture of two phases, for example, a mixture of a liquid and a gas. This is particularly true for the conveyance of diphasic hydrocarbons, such as the effluents from oil wells, at variable pressures which may reach about several tens of $kg/cm^2$, for example, about 10 to 100 $kg/cm^2$ and temperatures which may exceed about 100° C. The deterioration appears more or less rapidly according to the frequency of the compression-decompression cycles in the pipes for conveying hydrocarbons.

The deterioration manifests itself in the form of blisters and splits in the thickness of the elastomeric tube, and in the form of blisters, splits and swellings on the internal wall of this tube which is in contact with the hydrocarbons being conveyed. The internal cross-sectional passage area for the pipe thus decreases very rapidly, and the pipe may eventually become totally obstructed.

This phenomenon is found even with elastomers such as Viton (a copolymer of fluorovinylidene and hexafluoropropylene) which normally display a good resistance to liquid hydrocarbons, and occurs every time a mixture of liquid hydrocarbons, and gaseous hydrocarbons, which are subjected to very significant and rapid pressure variations, are conveyed through the pipe.

SUMMARY OF THE INVENTION

It is an object of the present invention to provide for a flexible pipe of a type referred to hereinabove which may be utilized for conveying diphasic fluids, i.e. fluids consisting of mixtures of a liquid and a gas. More particularly, the present invention is concerned with conveying, simultaneously and/or successively, these two phases of the same fluid, subjected to significant and rapid pressure variations, without the appearance of deteriorations on the elastomeric core of the pipe.

Another object of the present invention is to provide a tube which is adapted to convey hydrocarbons under pressure, such as for example, the effluents of oil wells.

A further object of the present invention is to provide a pipe which is adapted to convey simultaneously and/or successively hydrocarbons in the liquid state and gaseous hydrocarbons under pressure and subjected to significant and rapid pressure variations, without producing a deterioration of the elastomer which would require the rapid withdrawal of the pipe from use.

It is still another object of the present invention to provide a pipe for the conveyance of diphasic fluids, such as for example, the effluents of oil wells, without producing a deterioration of the elastomer constituting the tubular core of the pipe itself in the case where the elastomer being employed does not normally display a good resistance to hydrocarbons.

Other objects and further scope of applicability of the present invention will become apparent from the detailed description given hereinafter; it should be understood, however, that the detailed description and specific examples, while indicating preferred embodiments of the invention, are given by way of illustration and, since various changes and modifications within the spirit and scope of the invention will become apparent to those skilled in the art from this detailed description.

The flexible pipe according to the present invention comprises a flexible tubular core made from an elastomeric or plastic (synthetic) material, an internal reinforcing means which resists compression and is in contact with the internal wall of the aforementioned tubular core and a clamping means enclosing the tubular core. The clamping means consists of an elongated element helically wound around the core with a slight pitch angle. The internal reinforcing means and the clamping means assure an essentially continuous covering of the inner and outer walls respectively of the tubular core. The clamping means exerts a precompression force (stress) of the tubular core against the internal reinforcing means, the value of this precompression being at least equal to the maximum internal pressure, during operation, of the fluids being conveyed by the pipe, and not less than 50 kilograms per square centimeter.

The clamping means is an elongated element, such as a wire, strand or band which is wound around the tubular core and exerts thereon an essentially uniform compression stress along the entire pipe.

DESCRIPTION OF THE DRAWINGS

The present invention will become more fully understood from this detailed description given hereinbelow and the accompanying drawings which are given by way of illustration only and thus are not limitative of the present invention and wherein, FIGS. 1A and 1B, 2A and 2B and 3A and 3B, respectively, show three embodiments of a flexible pipe as proposed by the present invention. FIG. 1A, 2A and 3A illustrate the flexible pipe prior to the application thereon of the reinforcement or clamping means covering the tubular core of the pipe while FIG. 1B, 2B and 3B illustrate the flexible pipe after such application.

DESCRIPTION OF THE PREFERRED EMBODIMENTS

Figure 4:
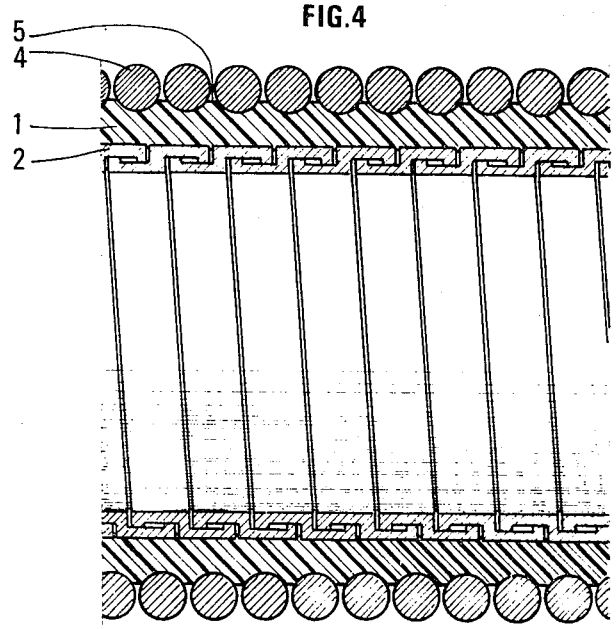
FIGS. 4 and 5 illustrate two further embodiments of the present invention.

Pursuant to the present invention it has been found that when a flexible material made of a natural or synthetic resin, such as an elastomer or other plastic material constituting the tubular core of a pipe conveying a diphasic fluid, such as for example a mixture of diphasic hydrocarbons in contact with the tubular core is subjected to a sufficient precompression force, the stability of the elastomer or plastic materials with respect to hydrocarbons is considerably increased.

Under these conditions it has been found that materials, such as natural rubber, which normally display a poor resistance to hydrocarbons were not damaged by the hydrocarbons, even under very severe conditions of use.

More precisely, it has been found that, in order to obtain these results, it was necessary to subject the elastomer or other plastic material to a precompression having a value of at least 50 kg/cm², and at least equal to the maximum internal of the fluids being conveyed.

These results have led to the development of a flexible pipe for the conveyance of diphasic hydrocarbons which exhibits an excellent stability with respect to hydrocarbons, even under very severe conditions of use that is, a pressure of several tens of kg/cm², for example about 10 to 100 kg/cm², a temperature higher than about 100° C. and substantial, as well as rapid pressure variations, that is, variations which may extend from a maximum pressure to a zero pressure, several times per hour.

The conduit proposed by the present invention comprises a flexible tubular core, made of an elastomeric or other plastic material, an internal reinforcing means adapted to withstand compression when in contact with the internal wall of the tubular core, and an external reinforcing or clamping means enclosing the tubular core and compressing it firmly against the internal reinforcing means. These reinforcing means are disposed in such a manner that as uniform as possible a distribution of the pressure on the tubular core is obtained, said pressures being exerted by means of the coaction of the two reinforcement means disposed on both sides of the tubular core, substantially covering said core.

The internal reinforcement means preferably comprises a helical winding of a band adapted to withstand compression, such as a metallic band. The band is applied against the internal wall of the tubular core with a spacing between adjacent turns, or unjoined portions, smaller than five-tenths mm and preferably smaller than three-tenths mm so as to obtain an essentially continuous surface in contact with the tubular core.

This internal reinforcement means may also advantageously consist of windings of a band, for example, a metallic band, the adjacent turns of which overlap.

The internal reinforcement means may consist of the winding of a band, particularly a metallic band or strip, whose cross section, perpendicular with respect to the edges of the band has either an S-shaped or Z-shaped configuration, and is adapted for the interconnection (overlapping) of adjacent turns (or convolutions) with respect to each other.

The external reinforcement means may be made of any of the various types of materials indicated above in connection with the internal reinforcement means, and it may, but generally is not of the same type as the latter.

This external reinforcement or clamping means may equally consist of a wire, strand, or band, which may be metallic and helically wound with a pitch angle $\alpha$ that is as small as possible, and with a spacing between the adjacent turns of convolutions smaller than five-tenths mm, preferably smaller than three-tenths mm.

Throughout the entire specification and claims, the angle of pitch $\alpha$ of the winding designates the angle which each turn forms with a plane perpendicular to the axis of the pipe.

As has been previously indicated, in order to increase the resistance to corrosion of the elastomeric core by hydrocarbons, it is essential that the core be subjected to a very high precompression stress. Since this precompression stress is exerted by the clamping or external reinforcement means, it is necessary to wind the clamping means around the core while exerting a significant tractive stress. For clamping purposes an elongated element is utilized having a cross section sufficient to withstand the tractive stresses at the time of clamping. However, in order not to reduce the flexibility of the pipe, the elongated element which constitutes the clamping means must have as small a cross section as is possible.

The best results, i.e., a high precompression of the tubular core, and a good flexibility of the pipe are obtained, in accordance with the present invention, with an angle of pitch $\alpha$ of the turns of the clamping means being as small as possible.

As a matter of fact, the pressure which is exerted by the clamping means on the tubular core is expressed by the formula $T = k \cdot P \cdot R \cdot d$ wherein, $T$ is the minimum tension expressed in kilograms (kg), exerted on the element constituting the clamping means at the time of winding thereof; $P$ is the minimum precompression of the tubular core expressed in kg/cm², $R$ is the inside radius of the pipe measured in centimeters (cm), $d$ is the breadth or width of the element constituting the clamping element in contact with the tubular core, measured in centimeters, and $k$ is a coefficient depending in particular upon the angle of pitch $\alpha$ of the winding and has a value increasing rapidly with the increase of the value $\alpha$.

Thus, for the same precompression value $P$ and radius $R$, it is necessary to exert a minimum tension $T$, which increases as the value of $\alpha$ increases. This, in turn, therefore necessitates a practical increase in width $d$, to maintain a proper mechanical resistance of the outer clamping means causing a decrease in flexibility of the pipe, and involving a flow of the elastomer of the tubular core in the direction of the axis of the pipe.

Likewise, it is not possible to replace the clamping means by a simple sleeve from a metallic structure since the latter would not allow for exerting upon the tubular core a sufficient precompression and thus a deterioration of the elastomer under the action of the hydrocarbons would be found.

Also, when the tubular core consists of a material which must be subjected to a thermal treatment, it is essential that it be carried out prior to the application of the clamping means, otherwise, this treatment would cause the precompression effect to disappear.

In order that the precompression stress is applied in an essentially uniform fashion along the tubular core, which is an important condition so that the pipe is adapted to withstand the chemical attack of the fluids being conveyed therethrough, it has been found that the spacing, or unjoined portion (area "e") between adjacent turns of the winding has to be smaller than five-tenths mm, and preferably smaller than three-tenths mm. Under these conditions, the pitch angle $\alpha$ of the helical winding is such that $\tan \alpha = (d + e)/\pi D$, wherein $D$ represents the outside diameter of the tubular core, $d$ is the width of the element constituting the clamping means, and $e$ is the unjoined area between adjacent turns. This tubular core made from an elastomer or from plastic material is designated in the various figures with the reference numeral 1.

In the embodiments shown in FIGS 1 and 2, the flexible internal reinforcement means 2 consists of a helical winding of a metallic band having an S-shaped profile. It is self-interconnectable by the partial covering or overlapping of the adjacent turns. This covering or overlapping has an external diameter at least equal to the internal diameter of the tubular core 1 and forms an essentially continuous surface in contact with the internal wall of the tubular core 1.

The internal reinforcement means 2 has sufficient resistance to compression so as to permit the extrusion of the tubular core 1 on the reinforcement means and its vulcanization.

Reference numeral 3 represents the corrugations of the core 1 in the hollow portions of the internal reinforcement means 2 which are produced at the time of extrusion of the core 1 on the reinforcement means 2. The reinforcement means 2 is made with a covering or overlapping of the adjacent turns, with a maximum relative displacement limited to a value no greater than five-tenths mm. This is achieved by an appropriate choice of the profile of the cross section of the band so that, whatever the elongation of the reinforcement means, it maintains a substantially continuous contact surface with the core 1 for a uniform distribution of the pressure being exerted on the reinforcement means.

A flexible external reinforcement means 4, or clamping means, is wound under tension around the tubular core 1 so as to obtain the compression of the latter between the two reinforcement means. The value of the minimum compression to be applied by the external reinforcement means has been chosen to be at least equal to the internal pressure to which the tubular core is exposed during operation, so that the tubular core 1 is not subjected to alternating compression and expansion stresses, which leads to the fatigue of the core and thus a rapid deterioration of the core by tearing.

In the example of FIG. 1, the clamping means consists of a metallic wire wound under tension. Reference numeral 5 shows the flow of the core 1 between the turns under the effect of the compression between the two reinforcements.

In order to obtain as uniform a distribution as possible of the pressure exerted by the reinforcement means 4 on the external wall of the core 1, the spacing or unjoined portion (area "$e$") of the turns of the reinforcement 4 is limited to no more than five-tenths mm and preferably is smaller than three-tenths mm. The minimum value of the unjoined area "$e$" will be chosen by one skilled in the art depending on the flexibility of the pipe which is desired to be obtained.

The single wire whose winding makes up the clamping means 4 may be replaced by a cable or strand (a unit or group of finer coiled wires).

The embodiment of the present invention according to FIG. 1 imparts to the pipe a great degree of flexibility. However, in the case where the pressure of the fluid being conveyed by the pipe is high, it is necessary to surround the clamping means 4 with one or more additional reinforcements to enable it to withstand the internal pressure.

On the basis of the tests that were carried out, an excellent stability toward diphasic hydrocarbons under pressure, that is, up to about 100 kg/cm², is obtained with a flexible pipe having an inside diameter of 50 mm and a tubular core thickness of about 3.5 mm, which has been clamped by a helical winding of a round metallic wire having a diameter of 2 mm. The spacing between adjacent turns is three-tenths mm and the value of the precompression stress is about 100 kg/cm².

In the embodiment of the present invention according to FIG. 2, the internal reinforcement 3 is identical with that in the preceding embodiment, and the external clamping means or flange consists of a winding of the same nature. This particular embodiment of the present invention provides a pipe which is capable of resisting a moderate internal pressure without it being necessary to cover or overlap the clamping means 6 of one reinforcement means.

In order that the pipe can be adapted to withstand a high internal pressure, and if necessary, axial changes and/or torsional moments (torques), it is advantageous to surround the clamping means 6 with either one or several reinforcements.

The embodiment according to FIG. 2 which may be complimented, if desired, by the addition of at least one reinforcement, is generally preferred in cases where the internal pressure is high, since the covering or overlapping of adjacent turns of the clamping means 6 prevents any accidental extrusion of the core 1 toward the outside due to the effect of the internal pressure.

In the modified embodiment shown in FIG. 3, both the two reinforcement means 7 and 8 which compress the tubular core 1 therebetween, consist of a metallic band having a rectangular cross section and wound under tension. The cross section of this band may also be square.

In comparison with the embodiment of FIG. 1, the embodiment of FIG. 3 affords the advantage of a better resistance to both the internal and external pressure at equal thicknesses of the internal and external reinforcement means.

The spacing between the adjacent turns of the reinforcement bands 7 and 8 is also chosen to be less than about five-tenths mm, and preferably less than about three-tenths mm, in order to distribute the pressure of the reinforcements against the tubular core 1 as uniformly as possible.

Reference numerals 9 and 10 show the flow of the tubular core between the turns of the reinforcements 7 and 8, respectively, as a result of the extrusion of the tubular core 1 on the reinforcement 7, and the clamping of the core 1 by the reinforcement 8.

FIG. 4 depicts a modification of FIG. 1 wherein the external clamping means 4 is a helically wound cable rather than a wire. As before, the spacing between adjacent turns of the wound cable are preferably less than about five-tenths mm.

In all of the embodiments according to the present invention described hereinabove, the internal reinforcement of the pipe is not fluid-tight and thus will not prevent the fluid being conveyed from coming in contact with the flexible tubular core 1.

However, it has been found that by using a pipe whose tubular core is made from an elastomer compressed between two reinforcement means as proposed by the present invention, the conveyance of liquid and gaseous hydrocarbons in the pipe produced no change whatsoever in the core of the pipe, even under severe operating conditions with respect to the temperature and the pressure of the hydrocarbon mixture being conveyed.

A cross section of the tested elastomer does not show any swelling or distention at the surface, nor any splitting or blistering in the thickness. However, the elastomer totally deteriorates under the same conditions if the pipe does not utilize two reinforcement means enclosing therebetween the tubular core 1 under the conditions defined in the present invention.

It has also been experimentally found that a flexible pipe according to the present invention whose tubular core is compressed between two reinforcement means with essentially continuous contact between the surfaces of the reinforcement means and the tubular core possesses a very satisfactory stability when conveying diphasic hydrocarbon mixtures, even when the elastomer constituting the core of the pipe is made of natural rubber (natural isoprene) or neoprene (polychloroprene), and specifically under very severe conditions of use, that is, a pressure of several tens of $kg/cm^2$, for example about 10 to 100 $kg/cm^2$, and a temperature higher than about 100° C. This result appears to be all the more surprising since these elastomers have normally a very poor behavior with respect to liquid hydrocarbons at the conditions utilized in the present invention.

In actual practice, the elastomer constituting the core of the flexible pipe includes, for example, Kel-F (a copolymer of fluorovinylidene and monochlorotrifluoroethylene), Viton (a copolymer of fluorovinylidene and hexafluoropropylene), fluoric silastene or fluoro-silastene (polyfluororsiloxane), silicone (polysiloxane), Hypalon (chlorosulfonated polyethylene), Perbunan or Hycar (butadiene or acrylonitrile), neoprene (polychloroprene), natural rubber (natural isoprene), butyl (a copolymer of isobutylene and isoprene), polyurethane, etc. The core of the pipe may also be made of a synthetic material having good flexibility properties, such as polyethylene, polyvinyl chloride, polypropylene, etc.

Other plastic materials which have less desirable qualities regarding flexibility, such as Nylon and Rilsan, can be employed inasmuch as the structure of the pipe reinforces the property of a good chemical resistance of these materials to the fluids being conveyed.

According to the present invention, the choice of the elastomer or of the plastic material being used in the pipe is no longer limited by its chemical resistance to the fluid being conveyed, but rather may be determined by other considerations, such as the dielectric properties, resistance to heat or to cold, and the like.

A flexible pipe according to the present invention such as the one illustrated in FIG. 1, may be obtained, for example, by extruding the elastomer in the pasty state around the metallic winding constituting the internal reinforcement means 2. The elastomer assumes the contours of the external surface of the reinforcement means at the time of vulcanization. The external reinforcement 4 is then wound around the elastomeric core by compressing it against the internal reinforcement 2.

A flexible pipe as proposed by the present invention displays an effective resistance to diphasic mixtures, and specifically not only those which flow inside the pipe, but also to hydrocarbons which would flow outside the pipe. In this situation, the elastomer does not show any change either on the surface or in its thickness, even after a prolonged period of operation.

If the temperature of the hydrocarbons being conveyed is susceptible to being varied considerably from one point of the pipe to another, or from one moment to the next at the same point, it will be advantageous to make the two reinforcements, i.e. the internal and the external one, of the same metal, or of metals having similar expansion coefficients. This will insure that the state of compression of the elastomer or of the thermoplastic material between the reinforcements are maintained, regardless of the temperature variations.

The type of internal reinforcement to be employed will advantageously be chosen from among those which bring about the smallest pressure drops in the fluid during its flow.

In the case of a pipe made up of successive elements being connected end to end, it will be expedient to maintain an internal reinforcement or, if desired, a continuous external reinforcement in close contact with the core of the pipe, up to the ends thereof for each element of the pipe, in a manner such as not to leave any place on the core of the pipe vulnerable to the attack of the fluid and/or fluids being conveyed.

At the places of the connections, the internal and the coordinated external reinforcements may consist of the conventional connecting elements for pipes, that is, tubular sleeves and/or nipples in the shape of truncated cones which extend the internal and external reinforcements of the pipe elements without discontinuity.

The type of metal constituting the wires, strands or bands which make up the reinforcements will be chosen as a function of the desired mechanical properties, the expected working conditions, and primarily the corrosiveness of the fluid flowing in the pipe.

Figure 5:
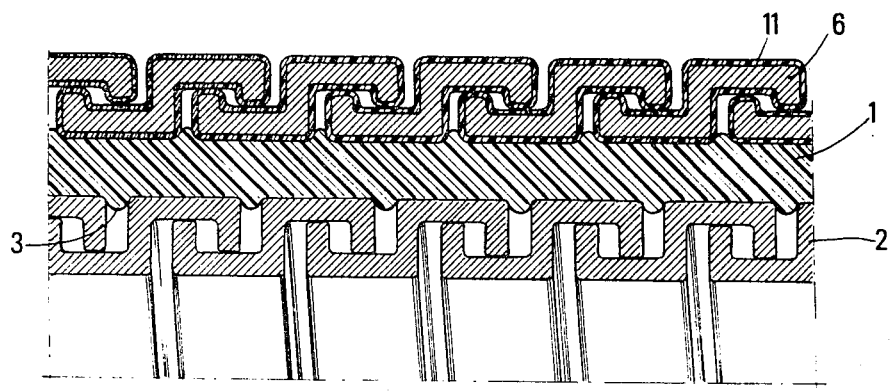

It is also possible to use metallic bands, wires or strands covered with a protective coating of an elastomeric or thermoplastic material, such as for example, polypropylene, silicones, rilsan, polyvinyl chloride, etc., and the like, as shown in FIG. 5. This Figure shows a modification of the embodiment of FIG. 2 wherein external clamping means 6 is coated with an elastomer or synthetic resin 11. Optionally, internal reinforcement means 2 can be similarly coated.

When the internal and/or the external pressures are low and the thermal conditions are not very severe, it is possible to use, instead of metal internal and/or external reinforcements, reinforcements consisting of wires, strands or bands made of thermoplastic or thermosetting material, and also synthetic fibers such as polyvinyl chloride, Rilsan, Nylon, glass fiber, etc. However, the internal reinforcement must have a sufficient resistance to implosion (collapse) so as to assure the permanent compression of the tubular core of the pipe between the internal reinforcement means and the external clamping reinforcement means and the resistance of the pipe with respect to external excess pressures that may arise in the course of manufacture and use of the pipe.

Exemplary of the metals which can be used for the internal and external reinforcement means include, for example, copper, aluminum, steel, stainless steel and the like The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A flexible pipe effective for conveying diphasic fluids under pressure which comprises a tubular core of flexible material, an internal compression-resisting reinforcement means in contact with the internal wall of said tubular core, an external clamping means surrounding said tubular core, said external clamping means maintaining said core in a state of compression against said internal reinforcement means, and said internal reinforcement means and said external clamping means each forming a substantially continuous contact surface with said tubular core, the value of the compression of the core being not less than 50 kg/cm² and at least equal to the maximum internal pressure of the fluid being conveyed in the pipe, the state of compression of the tubular core and the contact of the internal compression-resisting reinforcement means and the external clamping means with the core being sufficient to provide a pipe which is resistant to corrosive action in the conveyance of diphasic fluids under high pressure and temperature.

2. The flexible pipe of claim 1, wherein the clamping means comprises an elongated element helically wound along a small pitch angle.

3. The flexible pipe of claim 2, wherein the helical winding of the element constituting the clamping means has a pitch angle $\tan \alpha = (d+e)/(\pi d)$, wherein $D =$ the outer diameter of the tubular core,
$d =$ the width of the element constituting the clamping means, and
$e =$ the spacing between adjacent turns of the clamping means, $D$, $d$ and $e$ having the same units.

4. The flexible pipe of claim 1, wherein at least one of the internal reinforcement means and the external clamping means is composed of a band helically wound with a spacing between the adjacent turns of the winding being less than about five-tenths mm.

5. The flexible pipe of claim 4, wherein the spacing between the adjacent turns of the winding is less than about three-tenths mm.

6. The flexible pipe of claim 1, wherein at least one of the internal reinforcement means and the external clamping means is composed of a band helically wound in such a manner that the successive turns of the bands overlap.

7. The flexible pipe of claim 1, wherein at least one of the internal reinforcement means and the external clamping means is composed of a band helically wound in such a manner that the successive turns of the bands are interconnected with respect to each other.

8. The flexible pipe of claim 1, wherein the external clamping means is composed of a wire wound with a spacing between adjacent turns of the winding less than about five-tenths mm.

9. The flexible pipe of claim 1, wherein the external clamping means is composed of a cable wound with a spacing between adjacent turns of the winding being less than about five-tenths mm.

10. The flexible pipe of claim 1, wherein at least one of the internal reinforcement means and the external clamping means is metallic.

11. The flexible pipe of claim 1, wherein at least one of the internal reinforcement means and the external clamping means is made of a metal and coated with a synthetic resin.

12. The flexible pipe of claim 1, wherein at least one of the internal reinforcement means and the external clamping means is made of a metal and coated with an elastomer.

* * * * *